June 24, 1958  H. L. HARTZELL ET AL  2,839,935
ENGINE STARTER
Filed Nov. 18, 1955  2 Sheets-Sheet 1
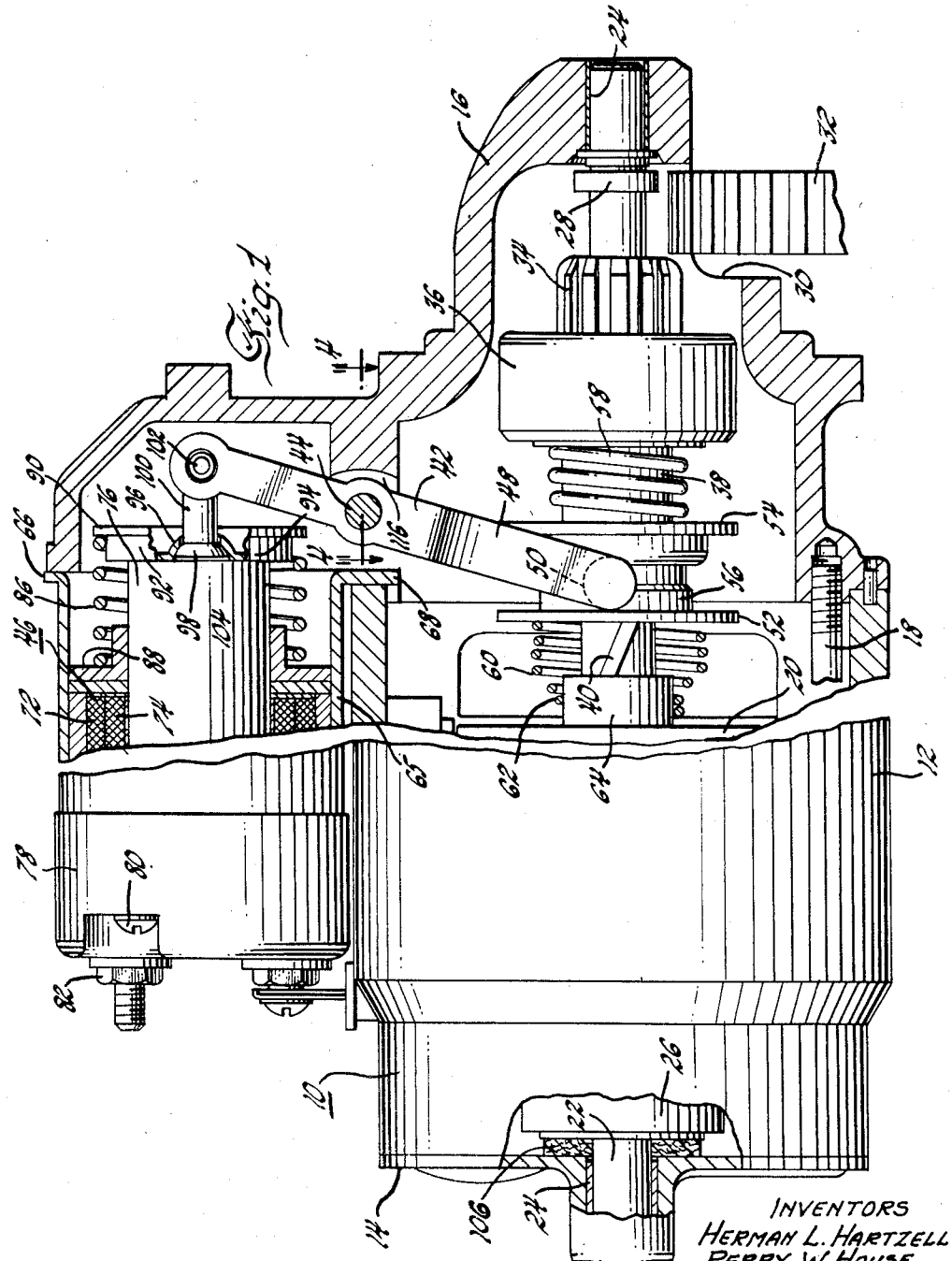
INVENTORS
HERMAN L. HARTZELL
PERRY W. HOUSE
CLARENCE E. TICE
CLAYTON W. SMITH
BY Craig V. Morton
THEIR ATTORNEY June 24, 1958   H. L. HARTZELL ET AL   2,839,935
ENGINE STARTER
Filed Nov. 18, 1955   2 Sheets-Sheet 2
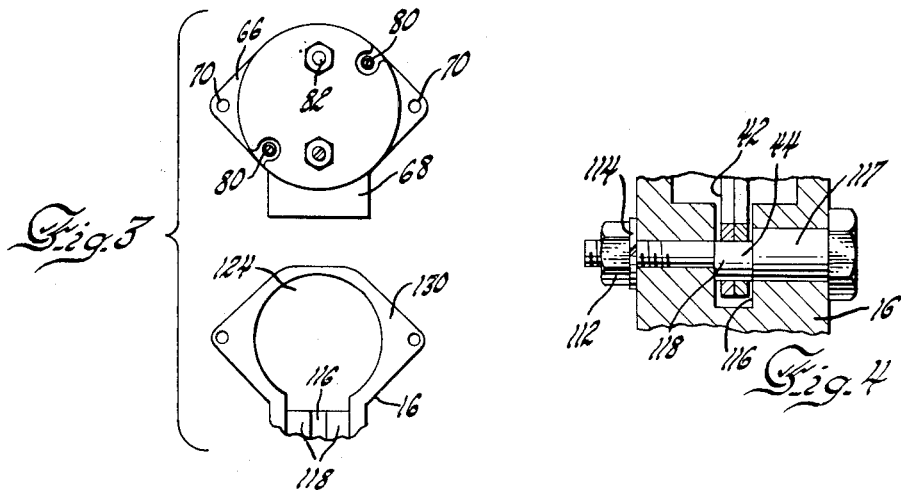
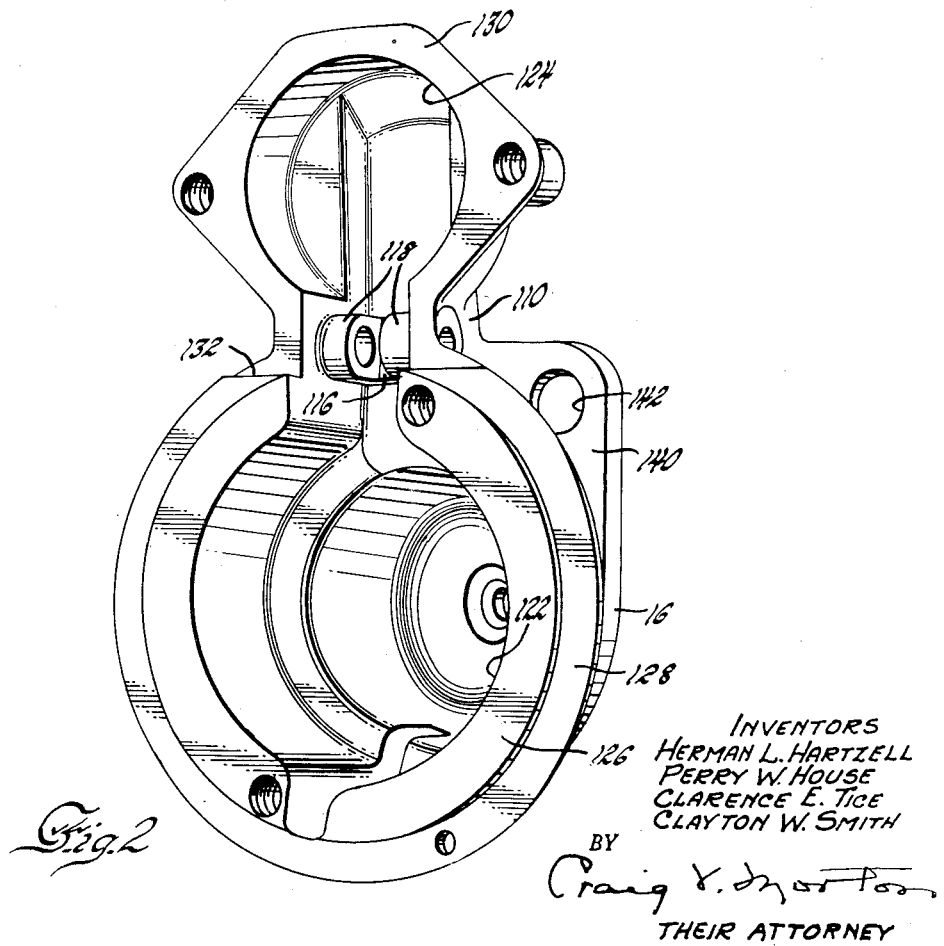
INVENTORS
HERMAN L. HARTZELL
PERRY W. HOUSE
CLARENCE E. TICE
CLAYTON W. SMITH
BY
Craig V. Morton
THEIR ATTORNEY

United States Patent Office 2,839,935
Patented June 24, 1958

2,839,935
ENGINE STARTER

Herman L. Hartzell, Edgewood, Perry W. House, Pendleton, Clarence E. Tice, Edgewood, and Clayton W. Smith, Anderson, Ind., assignors to General Motors Corporation, Detroit, Mich., a corporation of Delaware Application November 18, 1955, Serial No. 547,639

16 Claims. (Cl. 74—6)

This invention relates to starting motors for internal combustion engines and particularly to a starting motor having a pinion driven by the motor shaft which is movable axially with respect to the motor shaft into engagewith a gear on the engine so as to rotate said gear to start the engine and is disengaged from the engine gear when the engine becomes self operative.

In devices of this kind the mechanism for operating the pinion is generally one or the other of two general types. One type of device is automatic, the pinion being mounted on a helical thread and advanced into engagement with the engine gear by rotation of the starting motor shaft after the starting motor circuit is closed. In this type of device the pinion rotates with the motor shaft after its axial movement is stopped when in proper gear engaging position and it is automatically disengaged from the engine gear after the engine has become self operative due to the fact that the speed of the engine gear exceeds that of the pinion so that an axial movement of the pinion in a reverse direction is effected.

In the second type of device the pinion is rotatably mounted on the motor shaft and is adapted to be connected therewith for rotation by an over-running clutch, the driving member of which is splined to the shaft. The pinion and the clutch assembly are moved as a unit axially of the shaft, by a shifting lever which may be operated manually or by an electromagnet which is energized as the result of closing a manually closed switch and the starting motor switch itself is not closed until after engagement of the pinion with the engine gear, such switch being closed by the pinion shifting lever at the end of its pinion shifting movement. When the engine becomes self operative the pinion and driven clutch member over-run the driving member, releasing the clutch and the disengagement of the pinion from the engine gear is effected by manual operation of the pinion shifting lever, or by deenergization of the shifting magnet, which may be controlled manually or automatically by engine suction or by action of the generator, or by some other suitable means which is controlled by the engine.

The present invention relates primarily to the second type of starting device described, in which the shifting of the pinion into and out of engagement with the driven engine gear is effected by a pinion shifting magnet and the primary object of the present invention is to improve certain structural details in a motor of this type, so that a motor of better construction and superior operation can be produced at less cost.

With this object in view one feature of the invention resides in the provision of a spring surrounding the motor shaft, engaging the clutch assembly and urging said assembly toward the engine gear with which the pinion engages, so as to aid the shifting magnet in moving the pinion to gear engaging position. The provision of this spring permits use of a magnet of smaller size than heretofore used with satisfactory results, thus reducing cost of the magnet.

A further feature is the provision of a motor armature shaft which is movable axially to a slight extent so that a surface on the armature may be brought into engagement with a friction brake member, located between the armature and the end plate of the motor frame, when the pinion is disengaged from the engine gear to aid in stopping the motor's rotation after the motor circuit is opened.

In former devices of this character the end housing connected that end of the motor field frame adjacent the pinion enclosed the clutch assembly and pinion, but the shifting lever, which is moved to effect axial movements of the pinion into and out of engagement with the engine gear, extended through an opening in the housing and was connected at its upper end to the magnet armature entirely outside the housing. With this construction it was necessary to provide some means to prevent admission of dirt to the inside of the housing through the opening in which the shifting lever is positioned and also necessary to provide some sort of boot or cover over one end of the shifting magnet and the point of connection of the lever with the magnet armature. According to the present invention the end housing of the motor at the pinion end thereof is so constructed that it surrounds the pinion and clutch assembly, the entire shifting lever and its point of connection with the magnet armature and serves as a support for the shifting magnet. Also, the upper part of this housing adjacent the end of the magnet is separated from the lower part adjacent the end of the motor by a restricted throat which is open at one side to facilitate assembly of the lever in operative position.

Another feature of the invention is an eccentric pivot for the shifting lever which can be adjusted from outside the housing to accurately adjust the position of such lever and control the extent of movement of the pinion when the magnet is energized and the pinion advanced into position to engage the engine gear.

A further feature of the invention is a very much simplified connection between the upper end of the pinion shifting lever and the magnet armature.

Further objects and advantages of the present invention will be apparent from the following description, reference being had to the accompanying drawings wherein a preferred embodiment of the present invention is clearly shown.

In the drawings:

Fig. 1 is a side elevation, partly in vertical section, of a starting motor embodying the present invention.

Fig. 2 is a perspective view of the right end housing of the starting motor, seen from the left in Fig. 1.

Fig. 3 is a composite view, the upper part being an end elevation of the pinion shifting magnet, seen from the left in Fig. 1, and the lower part is an elevation of the upper part of the end housing to which the magnet is attached.

Fig. 4 is a detail section on the line 4—4 of Fig. 1.

Referring to Fig. 1, the reference numeral 10 designates the motor in its entirety and the motor per se is of substantially conventional construction comprising a field frame 12 which supports the field windings 13. End plates 14 and 16 are secured at opposite ends of the field frame by bolts 18. The motor armature is indicated at 20 and is secured to the motor shaft 22 which is journalled for rotation in the end plates 14 and 16, suitable bushings 24 being mounted in the end plates. The commutator, with which suitable brushes, not shown, cooperate, is indicated at 26. As already stated, the shaft 22 can move axially with respect to the motor frame a slight distance as determined by the position of a stop flange 28 which is integral with and extends from the motor shaft.

The end housing 16 is cut away as indicated at 30 in order that the engine flywheel gear 32 can occupy a position, when the starting motor is installed, adjacent the engine, where it will be engaged by the starter pinion 34 after a relatively short movement to the right, as seen in Fig. 1. The pinion is integral with or fixedly secured to the driven member of an over-running clutch 36 and the driving member of this clutch is integral with or secured to a sleeve 38 which is splined to the motor shaft by helical splines 40. The specific construction of this clutch is not material so far as the present invention is concerned, and the driven member of the clutch, to which the pinion is connected may be either the outside or inside member of the clutch, which may be of any conventional design, for example, that shown in the patent to Critchfield 2,211,053, August 13, 1940.

The clutch, the sleeve 38 and the pinion are all moved to the right as a unit to effect engagement of the pinion with the engine gear 32 and, when the engine becomes self operative, are moved back to the position shown in Fig. 1. These movements are effected by a lever 42 which is eccentrically mounted in the end plate 16 as will be later described and at its upper end is pivotally connected to the armature of an electromagnet, indicated generally by the reference number 46 and supported in fixed position on the motor housing in a manner more fully described later. The lower end of lever 42 is bifurcated so as to form two arms 48 which straddle the sleeve 38 and each of these arms has an inwardly projecting lug 50 which is received, when the device is assembled, between flanges 52 and 54 that extend from a collar 56 surrounding sleeve 38 and on which the collar is slidably supported. Between the collar 56 and the housing of clutch 36 a helical spring 58 surrounds the sleeve 38, the collar effecting movement of the pinion and clutch assembly when moved to the right, as seen in Fig. 1.

To move the pinion into engagement with the flywheel gear so that the motor can crank the engine for starting purposes the pinion and clutch assembly is moved to the right, in Fig. 1, by a counterclockwise movement of the lever 42 on its pivot 44, such movement being effected upon energization of the magnet 46. As the lower part of this lever moves to the right the lugs 50 engage the flange 54, pushing the collar 56 to the right, tending to compress the spring 58 and exerting a pressure on the clutch and pinion assembly which moves such assembly to the right. If there is no tooth abutment the pinion is simply moved directly into its full gear engaging position, but in the event that the pinion teeth abut those of the engine gear the axial movement of the pinion will be stopped and the continued movement of lever 42 will compress the spring 58 until there is sufficient rotation of the pinion to bring its teeth into proper alignment with those of the engine gear. This rotation will not be effected until the lever 42 has moved far enough for the starting motor circuit to be closed by action of the magnet 46. However, due to the provision of the helical splines 40 which are engaged by interior surface of the sleeve 38 there is some rotation of the sleeve, clutch and pinion during its advance movement axially toward the engine gear 32, and due to this slight rotary movement there is less tendency for the teeth of the pinion to abut those of the gear.

In the event of tooth abutment, as soon as the pinion is rotated sufficiently to bring its teeth into proper alignment with those of the gear, which is accomplished by a very slight rotary motion of the motor shaft immediately upon closing of the motor circuit, the pinion is moved into proper gear engaging position by expansion of the spring 58 and the further rotation of the starting motor rotates the engine gear 32 to effect starting of the engine.

When the engine begins to run under its own power the pinion and the driven clutch member are driven faster by the engine gear than is the driving clutch member by the motor. Therefore, the pinion and the driven clutch member over-run the driving member and the clutch is released. When the magnet 46 is deenergized, either manually or automatically as the case may be, the shifting lever 42 is moved clockwise and the collar 56 is moved to the left as seen in Fig. 1. This collar engages a snap ring, not shown, at the left end of the sleeve 38 so that, when the collar is moved as described, the sleeve 38 with the clutch and pinion assembly is moved to the left, disengaging the pinion from the engine gear 32.

It should be noted particularly that in the device disclosed a helical spring 60 surrounds the motor shaft 22 between the flange 52 of collar 56 and the end of the armature, such spring being of reduced diameter as indicated at 62, so as to have a relatively tight fit on an enlarged portion 64 of the motor shaft 22, which is provided immediately adjacent the end of the armature 20 and the end of this spring may be secured to such shaft in some suitable way if desired. This spring exerts a pressure on the flange 52, urging such flange toward the right, thereby assisting the magnet in effecting movement of the pinion and clutch toward the engine gear, and enabling a magnet of somewhat smaller size to be used than if this spring was not provided.

So far as the magnet 46 is concerned, the specific arrangement of the windings and the particular construction of the switch which is closed by such magnet to cause the starting motor to become operative, are entirely immaterial with reference to the present invention and may be of any conventional construction, for example, that shown in the patent to Dyer No. 2,287,791, June 30, 1942. This being true, in order to simplify the disclosure as much as possible, only enough of the specific construction of the magnet is shown to enable those skilled in the art to readily understand the operation of the device.

The magnet includes a metal housing 65 having a projecting flange 66 at the right end, a part 68 of which is of rectangular form, as indicated in Fig. 3, and is positioned, when the motor is assembled, between the end of the field frame 12 and the face of the end plate 16, as indicated in Fig. 1. The flange 66 has openings 70 through which supporting bolts pass when the magnet is assembled in position on the motor. As in the Dyer patent, above referred to, there are two windings 72 and 74, both of which are energized to effect movement of pinion 34 to gear engaging position and closing of the starting motor switch, but one of which is rendered ineffective, as in the Dyer device, when the switch is closed, so that more current may go to the starting motor during the cranking operation. When the magnet windings 72 and 74 are energized, the armature is moved to the left to operate the lever 42 as previously described, and also to close the starting motor switch.

The construction of the latter, being entirely immaterial to the present invention, is not shown, but includes two fixed contacts which are positioned in a housing 78 of suitable plastic material, secured to the left end of the magnet by screws 80 as indicated in Figs. 1 and 3. The fixed contacts are connected with binding post 80 adapted to be connected to the usual storage battery by a suitable conductor and binding post 82 which is connected by suitable means with the starting motor so that when the two fixed contacts are bridged by the movable contact current will flow from the battery to the motor to render the latter operative. The movable contact is moved into engagement with the fixed contacts by movement of the armature 76 to the left, through the medium of means which is not shown, but may be of conventional construction, for example, that shown in the Dyer patent.

Movement of the armature to the left is opposed by a relatively strong spring 86, which is positioned between a fixed plate 88, secured in position in the housing 64 in any suitable way and a flange 90 which projects outwardly from a cup-shaped member 92 having a closed end 94 which is secured to the end of the armature in any suitable way. The spring 86 exerts a pressure on the flange 90 at all times urging said flange and the armature 76 to the right so that when the magnet is de-energized, this spring is effective to return the armature, the lever 42 with the clutch and pinion assembly to the normal position shown in Fig. 1, spring 86 being considerably stronger than the spring 60, which tends to urge such assembly to the right.

At the center of the element 94, it is formed with a semi-spherical extension 96 which projects to the right as seen in Fig. 1 and forms between itself and the end of armature 76 a recess in which is received the enlarged head 98 of a short link 100 which extends through an opening in the extension 96 and is pivotally connected by a tubular pin 102 to the upper end of the lever 42. This pin is in the form of a longitudinally split steel tube which is inserted in a hole in the link 100 where it expands after insertion and holds itself fixed in position without use of additional retaining means. That part of enlarged head 98 which is contiguous to the surface of extension 96 is of the same shape as such surface so that the arrangement forms a universal connection between the link 100 and the armature, the opening through which the link 100 extends being enough larger than the link to permit considerable racking movement of the link in any direction.

The enlarged head 98 of the link 100 has a flat surface 104 adjacent the hub spaced from the end of the armature, so that the link has a limited movement with respect to the armature, and there is also some lost motion between the lever 42 and the pivot pin 102. Lost motion between the armature and the pinion shifting lever is necessary to enable opening of the starting motor circuit under certain circumstances, as in the event of prolonged cranking when the engine is cold and fails to start. Under such circumstances, even if the magnet is de-energized to effect opening of the circuit, the pinion might be held in engagement with gear 32 because of friction and, unless there is some form of lost motion connection between lever 42 and the armature, the latter could not move to the right to effect opening of the switch closed by such armature.

As previously stated, the motor shaft 22 can have a slight axial movement, the extent of this movement being determined by the member 28. Surrounding the shaft 22 adjacent the left end thereof is a washer 106 of suitable friction material. This washer may be secured to the end plate 14 of the motor, could be secured in position relative to the motor shaft by attachment to the armature or it can simply be carried on the shaft and not fixedly attached to the shaft or any other part. As disclosed, the washer 106 is carried by the shaft and can rotate relatively thereto. When the magnet 46 is de-energized and lever 42 moved clockwise by spring 86, the spring 60 is compressed, exerting a pressure on the armature 20 and moving it with shaft 22 to the left. The washer 106 is then engaged by a surface on the armature and the end plate 14 so that it acts as a brake to stop rotation of the motor.

As indicated previously, the lever 42 is eccentrically mounted with respect to the pin 44. This structure is shown in Fig. 4 and it will be apparent that the pivot pin 44 is a bolt which extends through a restricted neck portion 110 of the end housing 16 and lies between larger parts of such housing which are above and below the neck 110 and are in alignment with the magnet 46 and the motor armature 20. The bolt may be held in any adjusted position by a suitable nut 112 and lock washer 114. The lever 42, when assembled in operative position, is received in a slot 116 formed in the end housing 16 and the bolt extends through projecting portions of the end housing 16 which lie on opposite sides of the lever and form the walls of the slot 116. That part of the pin or bolt 44 which lies within the slot 116, designated by the number 118, and on which lever 42 is pivotally mounted, is eccentric with respect to the pin as clearly shown in Fig. 4. The bolt or pin 44 is enlarged, as indicated at 117, and this is necessary because the bore in which the bolt is received must be large enough at the right end to enable the eccentric surface 118 to be moved through this bore and into position. By loosening the nut 112 and rotating the pin or bolt to a different position, the position of the lever 42 can be very accurately adjusted from outside the housing. This eccentric mounting for the lever 42 may be omitted if desired and a simple pivot pin employed, but the eccentric mounting is most useful and accomplishes a very desirable result.

One of the features of the present invention is the construction of the end housing 16. In earlier devices of the type disclosed herein, the end housing at the pinion end of the motor has been about like that disclosed in the patent to Critchfield, with the pinion shifting lever extending through an opening in the top of the housing through which dirt can get into the interior of such housing unless some means is provided to prevent admission of such dirt and, if a magnet is employed to operate such lever, some sort of protective boot or cover should be provided to cover up the end of the armature and the point of connection of the pinion shifting lever with its operating link. In the device of Fig. 1, the end housing 16 has been extended upwardly so that it not only covers the clutch and pinion assembly and the end of the motor 10, but also fully closes the shifting lever 42, its operating link and the end of magnet 46, in fact, the magnet is supported by this end housing 16 instead of by the field frame of the motor, as is the usual practice.

In Fig. 2 is shown a perspective view of the end housing 16 as seen from the left in Fig. 1 and it will be apparent that such housing has a large opening 122 at the bottom through which the pinion and clutch assembly extends and a smaller opening 124 at the top, into which the end of armature 76 and the operating link 100 for lever 42 extend, the lever being pivotally mounted, as previously described in a constricted neck 110 of the housing that lies between the openings 122 and 124. There is an open throat 120 in this constricted neck portion of the end housing, connecting the openings 122 and 124, so that the pinion shifting lever can simply be pushed into position in slot 116 from the left, through the open throat and the bolt 44 can then be pushed into position from the right, enabling the assembly of the shifting lever in position to be very easily accomplished.

The face of the end housing 16 which is adjacent the end of the field frame 12 has a raised rib 126 of generally annular form which, when the device is assembled, extends into the end of the field frame as shown in Fig. 1, while a flat surface 128 surrounds this rib and engages the end of field frame 12. The upper part of the face of housing 16 which surrounds opening 124, is flat, as indicated at 130 and is not in alignment with the surface 128, but is slightly offset with respect thereto, so as to form a shoulder 132 which is engaged by the bottom of the flange 68 when the parts are assembled. The surface 130 is engaged by the face of the flange 66 when the magnet is secured to the housing and the engagement of the shoulder 132 by the lower edge of the extending flange 68 aids in lining up the holes 70 in the flange 66 with threaded holes in the end housing 16 into which the attaching bolts for the magnet are secured, thus facilitating assembly of the parts. Also the flange 68 closes the throat 120 when the device is assembled, preventing any admission of dirt.

A part of the attaching flange through which bolts extend for attaching the starting motor to the engine is indicated at 140 and one of the openings in which the attaching bolts are received is indicated at 142, in Fig. 2.

While the embodiment of the present invention as herein disclosed, constitutes a preferred form, it is to be understood that other forms might be adopted,

What is claimed is as follows:

1. In starting apparatus for an internal combustion engine, an electric motor operable to start said engine, said motor having a field frame and a rotatable armature shaft extending therefrom, a pinion movable axially on said shaft into engagement with a gear of the engine to be started, means for connecting said pinion to the armature shaft for rotation therewith when the pinion engages said engine gear so that rotation of the armature shaft will rotate said gear, a lever extending above the motor and operably connected to the pinion at its lower end so as to shift said pinion axially on the shaft, an electromagnet having an armature operatively connected to the upper end of said lever and effective to move said pinion into gear engaging position when said magnet is energized, a single end housing member secured in position on the field frame and serving as a closure member to close one end of both the motor and the magnet, said housing member having an upper opening into which the magnet armature extends, a lower opening through which the motor shaft and pinion are projected when the device is assembled, and a restricted recess having an open side for permitting passage of the lever during assembly of the lever with the magnet armature and pinion and means for attaching the magnet to said housing member so that the magnet is supported thereby.

2. In starting apparatus for an internal combustion engine, an electric motor operable to start said engine, said motor having a field frame and a rotatable armature shaft extending therefrom, a pinion movable axially on said shaft into engagement with a gear of the engine to be started, means for connecting said pinion to the armature shaft for rotation therewith when the pinion engages said engine gear so that rotation of the armature shaft will rotate said gear, a lever extending above the motor and operably connected to the pinion at its lower end so as to shift said pinion axially on the shaft, an electromagnet having an armature operatively connected to the upper end of said lever and effective to move said pinion into gear engaging position when said magnet is energized, a single end housing member secured in position on the field frame and serving as a closure member to close one end of both the motor and the magnet, said housing member having an upper opening into which the means for connecting the magnet armature extends and a lower opening through which the motor shaft and pinion are projected when the device is assembled, and a restricted throat open on one side connecting said upper and lower openings, said open side of the throat being arranged so the pinion shifting lever may be moved laterally into position into the upper and lower openings in said closure member when the device is assembled.

3. In starting apparatus for an internal combustion engine, an electric motor operable to start said engine, said motor having a field frame and a rotatable armature shaft extending therefrom, a pinion movable axially on said shaft into engagement with a gear of the engine to be started, means for connecting said pinion to the armature shaft for rotation therewith when the pinion engages said engine gear so that rotation of the armature shaft will rotate said gear, a lever extending above the motor and operably connected to the pinion at its lower end so as to shift said pinion axially on the shaft, an electromagnet having an armature operatively connected to the upper end of said lever and effective to move said pinion into gear engaging position when said magnet is energized, a single end housing member secured in position on the field frame and serving as a closure member to close one end of both the motor and the magnet, said housing member having an upper opening into which the means for connecting the magnet armature extends and a lower opening through which the motor shaft and pinion are projected when the device is assembled, and a restricted throat connecting said upper and lower openings, said throat being open at one side so that the pinion shifting lever may be moved laterally into position in said throat in assembling the parts of the device.

4. In starting apparatus for an internal combustion engine, an electric motor operable to start said engine, said motor having a field frame and a rotatable armature shaft extending therefrom, a pinion movable axially on said shaft into engagement with a gear of the engine to be started, means for connecting said pinion to the armature shaft for rotation therewith when the pinion engages said engine gear so that rotation of the armature shaft will rotate said gear, a lever extending above the motor and operably connected to the pinion at its lower end so as to shift said pinion axially on the shaft, an electromagnet having an armature operatively connected to the upper end of said lever and effective to move said pinion into gear engaging position when said magnet is energized, a single end housing member secured in position on the field frame and serving as a closure member to close one end of both the motor and the magnet, said housing member having an upper opening into which the means for connecting the magnet armature extends and a lower opening through which the motor shaft and pinion are projected when the device is assembled, a restricted throat connecting the upper and lower openings and through which the pinion shifting lever extends and a pivot pin extending across said throat and through the pinion shifting lever so as to serve as a pivotal mounting for the latter.

5. In starting apparatus for an internal combustion engine, an electric motor operable to start said engine, said motor having a field frame and a rotatable armature shaft extending therefrom, a pinion movable axially on said shaft into engagement with a gear of the engine to be started, means for connecting said pinion to the armature shaft for rotation therewith when the pinion engages said engine gear so that rotation of the armature shaft will rotate said gear, a pivoted lever operatively connected to the pinion at one end and movable to engage and disengage the pinion from the engine gear, means for operating said lever, an end housing member forming a closure for one end of the motor and surrounding the pinion and the end of the lever which is operatively connected thereto and a pivot pin for said lever adjustably mounted in said housing member and adjustable from the outside of said member, said pin having an eccentric surface on which said lever is mounted.

6. In starting apparatus for an internal combustion engine, an electric motor operable to start said engine, said motor having a field frame and a rotatable armature shaft extending therefrom, a pinion movable axially on said shaft into engagement with a gear of the engine to be started, means for connecting said pinion to the armature shaft for rotation therewith when the pinion engages said engine gear so that rotation of the armature shaft will rotate said gear, a pivoted lever operatively connected to the pinion at one end and movable to engage and disengage the pinion from the engine gear, means for operating said lever, an end housing member forming a closure for one end of the motor and entirely surrounding the pinion shifting lever and the pinion, a pivot pin for said lever adjustably mounted in said housing member, means outside said housing member for effecting adjustments of said pin and an eccentric surface on said pin on which said lever is mounted so that by adjustment of said pin the position of said lever can be modified.

7. In starting apparatus for an internal combustion engine, an electric motor operable to start said engine, said motor having a field frame and a rotatable armature shaft extending therefrom, a pinion movable axially on said shaft into engagement with a gear of the engine to be started, means for connecting said pinion to the armature shaft for rotation therewith when the pinion engages said engine gear so that rotation of the armature shaft will rotate said gear, a lever operatively connected to the pinion at one end and operable to move said pinion axially on the shaft, an electromagnet located adjacent and substantially parallel to said motor, said magnet having an armature operatively connected to the other end of said lever and effective to move said pinion into gear engaging position, a single end housing surrounding the pinion and all of the pinion shifting mechanism including said lever and secured to the end of the motor field frame in position to form a closure for one end of both the motor and magnet, a rotatably adjustable pivot pin for said lever mounted in said housing member and extending beyond the wall thereof, means outside said housing member for adjusting said pin and an eccentric surface on said pin on which said lever is mounted whereby the position of said lever may be modified by adjustment of said pin.

8. In starting apparatus for an internal combustion engine, an electric motor operable to start said engine, said motor having a field frame and a rotatable armature shaft extending therefrom, a pinion movable axially on said shaft into engagement with a gear of the engine to be started, means for connecting said pinion to the armature shaft for rotation therewith when the pinion engages said engine gear so that rotation of the armature shaft will rotate said gear, a lever extending above the motor and operably connected to the pinion at its lower end so as to shift said pinion axially on the shaft, an electromagnet having an armature operatively connected to the upper end of said lever and effective to move said pinion into gear engaging position when said magnet is energized, a single end housing member secured in position on the field frame and serving as a closure member to close one end of both the motor and the magnet, said housing member having an upper opening into which the means for connecting the magnet armature extends and a lower opening through which the motor shaft and pinion are projected when the device is assembled, a restricted throat connecting the upper and lower openings and through which the pinion shifting lever extends, a pivot pin for said lever rotatably mounted in said housing member and extending through the wall thereof, an eccentric surface on that part of said pin positioned in said restricted throat on which said lever is mounted and means outside said housing member for adjusting said pin to modify the position of said lever.

9. In starting apparatus for an internal combustion engine, an electric motor operable to start said engine, said motor having a field frame and a rotatable armature shaft extending therefrom, a pinion movable axially on said shaft into engagement with a gear of the engine to be started, means for connecting said pinion to the armature shaft for rotation therewith when the pinion engages said engine gear so that rotation of the armature shaft will rotate said gear, a lever operatively connected to the pinion at one end and operable to move said pinion axially on the shaft into and out of engagement with said engine gear, a spring normally holding said pinion out of engagement with said gear, means for moving said lever against the force of said spring to move said pinion into gear engaging position and a second spring of less strength than the first spring and urging the pinion toward gear engaging position.

10. In starting apparatus for an internal combustion engine, an electric motor operable to start said engine, said motor having a field frame and a rotatable armature shaft extending therefrom, a pinion movable axially on said shaft into engagement with a gear of the engine to be started, means for connecting said pinion to the armature shaft for rotation therewith when the pinion engages said engine gear so that rotation of the armature shaft will rotate said gear, a lever operatively connected to the pinion at one end and operable to move said pinion axially on the shaft into and out of engagement with said engine gear, an electromagnet having an axially movable armature operatively connected with the other end of said lever and effective to move the pinion to gear engaging position when the magnet is energized, a spring engaging the armature and effective when the magnet is de-energized to hold the lever in such position that the pinion is disengaged from said engine gear and a second spring of less strength than said first spring effective at all times to urge the pinion toward gear engaging position.

11. In starting apparatus for an internal combustion engine, an electric motor operable to start said engine, said motor having a field frame and a rotatable armature shaft extending therefrom, a pinion movable axially on said shaft into engagement with a gear of the engine to be started, means for connecting said pinion to the armature shaft for rotation therewith when the pinion engages said engine gear so that rotation of the armature shaft will rotate said gear, a lever operatively connected to the pinion at one end and operable to move said pinion axially on the shaft into and out of engagement with said engine gear, an electromagnet having an axially movable armature operatively connected with the other end of said lever and effective to move the pinion to gear engaging position when the magnet is energized, a spring engaging the armature and effective when the magnet is de-energized to hold the lever in such position that the pinion is disengaged from said engine gear and a second spring of less strength than said first spring constantly exerting a pressure directly on the first named end of said lever tending to move said lever in a direction to effect engagement of the pinion with the engine gear.

12. In starting apparatus for an internal combustion engine, an electric motor operable to start said engine, said motor having a field frame and a rotatable shaft having an armature secured thereto extending therefrom, a pinion movable axially on said shaft into engagement with a gear of the engine to be started, means for connecting said pinion with said shaft for rotation therewith when the pinion engages said engine gear, a collar movable axially on said shaft and operatively connected to said pinion so that axial movements of the collar effect axial movements of the pinion, a pivoted pinion shifting lever engaging said collar, an electromagnet having an axially movable armature operatively connected with said lever and effective when energized to actuate said lever and move said collar so as to move the pinion to gear engaging position, a spring engaging the armature of the magnet and opposing movement of said armature in a direction to move the pinion into engagement with the engine gear, a second spring of less strength than the first named spring positioned between said collar and the armature of the motor, said second spring urging the pinion toward the engine and aiding the magnet in effecting movement of said pinion to its gear engaging position.

13. In starting apparatus for an internal combustion engine, an electric motor operable to start said engine, said motor having a field frame and a rotatable shaft having an armature secured thereto extending therefrom, a pinion movable axially on said shaft into engagement with a gear of the engine to be started, an electromagnet for effecting such movement of the pinion means permitting a relatively slight axial movement of the motor shaft, means for moving said pinion out of engagement with the engine gear when said magnet is de-energized and for simultaneously moving said collar away from said engine gear, a friction member positioned adjacent the end of said motor shaft opposite that on which the pinion is supported and engageable by the motor armature upon movement of the armature and shaft toward said friction member, a spring surrounding the shaft between the collar and the motor armature, said spring being compressed by movement of said collar when the magnet is de-energized and effective to move the motor shaft and armature axially to bring the armature into engagement with said friction member whereby said member acts as a brake to stop rotation of the motor shaft.

14. In starting apparatus for an internal combustion engine, an electric motor operable to start said engine, said motor having a field frame and a rotatable armature shaft extending therefrom, a pinion movable axially on said shaft into engagement with a gear of the engine to be started, means for connecting said pinion to the armature shaft for rotation therewith when the pinion engages said engine gear so that rotation of the armature shaft will rotate said gear, a lever operatively connected to the pinion at one end and operable to move said pinion axially on the shaft, an electromagnet for actuating said lever and having an axially movable armature, an operating link for connecting said armature with the other end of said lever and a universal joint connecting said link with the armature.

15. In starting apparatus for an internal combustion engine, an electric motor operable to start said engine, said motor having a field frame and a rotatable armature shaft extending therefrom, a pinion movable axially on said shaft into engagement with a gear of the engine to be started, means for connecting said pinion to the armature shaft for rotation therewith when the pinion engages said engine gear so that rotation of the armature shaft will rotate said gear, a lever operatively connected to the pinion at one end and operable to move said pinion axially on the shaft, an electromagnet for actuating said lever and having an axially movable armature, an operating link for connecting said armature with the other end of said lever, said link having an enlarged head forming part of a universal joint connection between the armature and said link and spaced from the end of the armature so that the latter can make some movement while the operating link remains stationary.

16. In starting apparatus for an internal combustion engine, an electric motor operable to start said engine, said motor having a field frame and a rotatable armature shaft extending therefrom, a pinion movable axially on said shaft into engagement with a gear of the engine to be started, means for connecting said pinion to the armature shaft for rotation therewith when the pinion engages said engine gear so that rotation of the armature shaft will rotate said gear, a lever operatively connected to the pinion at one end and operable to move said pinion, a lever extending above the motor and operably connected to the pinion at its lower end so as to shift said pinion axially on the shaft, an electromagnet having an armature operatively connected to the upper end of said lever and effective to move said pinion into gear engaging position when said magnet is energized, a single end housing member secured in position on the field frame and serving as a closure member to close one end of both the motor and the magnet, said housing member having an upper opening into which the means for connecting the magnet armature extends and a lower opening through which the motor shaft and pinion are projected when the device is assembled, a restricted throat connecting the upper and lower openings in which the pinion shifting lever is received, means for attaching the magnet to said housing member so that the magnet is supported thereby, a shoulder formed on the face of said housing member between said openings and adjacent the restricted throat, and a substantially rectangular flange formed on said magnet adapted to engage said shoulder when the magnet is assembled so as to properly position the magnet and forming a closure for said restricted throat.

References Cited in the file of this patent

FOREIGN PATENTS 297,139    Switzerland _____ May 17, 1954